US006663177B2

United States Patent
Blanco et al.

(10) Patent No.: US 6,663,177 B2
(45) Date of Patent: Dec. 16, 2003

(54) ADVANCED ELASTOMERIC INTEGRAL SUSPENSION SEATING SYSTEM

(75) Inventors: Ernesto E. Blanco, Belmont, MA (US); H. Winston Maue, Northville, MI (US); Sofy Tarud, Barranquilla (CO); Joshua A. Goldwitz, Brooklyn, NY (US); Josue Sznitman, Zurich (CH); Mara B. Ignatius, Detroit, MI (US)

(73) Assignee: Lear Corporation, Southfield, MI (US)

( * ) Notice: Subject to any disclaimer, the term of this patent is extended or adjusted under 35 U.S.C. 154(b) by 0 days.

(21) Appl. No.: 10/015,278

(22) Filed: Dec. 12, 2001

(65) Prior Publication Data
US 2002/0089219 A1 Jul. 11, 2002

Related U.S. Application Data
(60) Provisional application No. 60/255,516, filed on Dec. 13, 2000.

(51) Int. Cl.[7] ................................................. A47C 7/02
(52) U.S. Cl. ............................... 297/284.2; 797/284.1; 797/284.4; 5/657
(58) Field of Search .................... 297/284.2, 284.4, 297/440.11, 284.1, 452.56, 452.63, 452.64; 5/652, 657, 120, 125

(56) References Cited

U.S. PATENT DOCUMENTS

| | | | |
|---|---|---|---|
| 1,680,963 A | | 8/1928 | White |
| 1,955,687 A | | 4/1934 | Scott |
| 2,156,664 A | | 5/1939 | Litle, Jr. |
| 2,534,502 A | | 12/1950 | Dewey |
| 2,809,692 A | * | 10/1957 | Taffae ................... 297/440.11 |
| 2,856,990 A | | 10/1958 | Thomas |
| 3,081,131 A | | 3/1963 | Brueder |
| 3,258,259 A | * | 6/1966 | Bohlin .......................... 267/89 |
| 3,273,877 A | * | 9/1966 | Geller et al. .................. 267/89 |
| 3,512,831 A | | 5/1970 | Flint |
| 3,642,319 A | * | 2/1972 | Berchicci ................. 297/284.4 |
| 4,190,289 A | * | 2/1980 | Brunig et al. ............... 297/391 |
| 4,318,556 A | | 3/1982 | Rowland |
| 4,425,910 A | | 1/1984 | Meiller |
| 4,456,301 A | * | 6/1984 | Apissomian ............. 297/448.2 |
| 4,627,661 A | * | 12/1986 | Ronnhult et al. ........ 297/284.4 |
| 4,723,816 A | | 2/1988 | Selbert et al. |
| 4,761,035 A | * | 8/1988 | Urai ....................... 297/452.56 |
| 4,925,242 A | * | 5/1990 | Harris et al. ............. 297/284.4 |
| 5,013,089 A | * | 5/1991 | Abu-Isa et al. ......... 297/452.64 |
| 5,048,894 A | | 9/1991 | Miyajima et al. |
| 5,403,069 A | | 4/1995 | Inara et al. |
| 5,494,332 A | * | 2/1996 | Daniel ..................... 297/284.4 |
| 5,775,779 A | * | 7/1998 | Abu-Isa et al. ......... 297/452.56 |
| 5,971,466 A | * | 10/1999 | Hashimoto ............... 296/65.02 |
| 6,056,367 A | | 5/2000 | Hsiao |
| 6,406,093 B1 | * | 6/2002 | Miotto et al. ............ 297/218.5 |

* cited by examiner

Primary Examiner—Peter R. Brown
Assistant Examiner—Joseph Edell
(74) Attorney, Agent, or Firm—Bill C. Panagos

(57) ABSTRACT

A vehicle seat formed by a contoured tubular frame defining the edges of a seat base and a seat back and having tensioned belts and an elastomeric mesh seat fabric. The contoured tubular frame is wrapped in foam padding for comfort and impact protection. Two belts are provided in each of the seat base and seat back. The elastomeric seat mesh fabric forms an elastomeric seating surface that wraps around the seat occupant. The elastomeric mesh seat fabric is secured to the belts that provide seating surface contour and minimize excursion of the elastomeric mesh seat fabric. A cushion is provided under the elastomeric seating surface near the front of the seat to prevent submarining in an impact. An eccentric lumbar cushion is provided on a flexible shaft to permit adjustment of the degree of lower back support.

14 Claims, 2 Drawing Sheets

ADVANCED ELASTOMERIC INTEGRAL SUSPENSION SEATING SYSTEM

CROSS-REFERENCE TO RELATED APPLICATIONS

This application claims the benefit of U.S. provisional application Ser. No. 60/255,516 filed Dec. 13, 2000, which is incorporated herein in its entirety.

BACKGROUND OF THE INVENTION

1. Field of the Invention

The present invention relates to a vehicle seat having a tubular frame and elastomeric fabric seating surface.

2. Background Art

Vehicle seats have long been formed of interconnected spring support elements covered by padding material and upholstery. Vehicle seat construction has been simplified in recent years by utilizing structural foam supported by frames or rigid panels that are covered by fabric, vinyl or leather upholstery.

Office chairs are known that are formed by a frame having mesh webbing covering the seating surfaces thereof. These designs have not been effectively adapted for automobile seating purposes.

The above problems and disadvantages are addressed by the present invention that answers the long felt need of providing a elastomeric seating system that is adjustable and well suited to the requirements of a vehicle seat.

SUMMARY OF THE INVENTION

The invention is directed to an elastomeric fabric, self-supporting vehicle seat having a rugged tubular frame that is highly contoured to provide three dimensional occupant support. The seat frame must be securely wrapped with sufficient padding for a passenger's body resting on elastomeric seating surfaces. Such a seat must be able to maintain its desirable characteristics through a wide range of conditions including the full range of temperatures encountered in a vehicle interior. The invention also may relate to an elastomeric seat having belts that do not have a "sling-shot" effect and the seat must not allow an occupant's body to "submarine" in the event of an impact. The vehicle seating system may also have a lumbar support that is easily adjustable and provides a comfortable ergonomic shape.

According to one aspect of the invention, a vehicle seat for a person riding in a vehicle is provided by a contoured tubular frame, at least one belt, and an elastomeric mesh seating surface. The contoured tubular frame defines the edges of a seat base and a seat back. At least one belt is secured to the tubular frame. The elastomeric mesh seating surface is secured to the tubular frame and the belt wherein the belt draws the mesh seating surface into a concave shape within the tubular frame to provide a concave seating surface.

According to another feature of the invention, a contoured tubular frame defines the edges of a seat base and a seat back providing a supportive curvature. The frame is wrapped in foam padding to provide comfort and impact protection. The geometry of the frame is configured to provide an aesthetically pleasing seating surface contour.

According to yet another aspect of the invention, two tensioned belts may be provided in each of the seat base and seat back with the tensioned belts in the seat base extending longitudinally relative to the vehicle while the two tensioned belts in the seat back extending substantially vertically on the seat back. The tensioned belts may be provided that are secured to an upper portion of the seat back of the tubular frame and to a portion of the front seat base of the tubular frame. The belts support the elastomeric mesh seat fabric to form a comfortable three-dimensional elastomeric mesh seating surface that wraps around a seat occupant. The tensioned belts are made of a material that is not subject to changes in elasticity through a wide range of environmental conditions.

The tensioned belts are sewn, fastened, adhered or otherwise secured to the elastomeric mesh seat fabric and anchored to elastomeric foam that is wrapped around portions of the frame. The mesh seating surface is secured to the tensioned belts to minimize excursion of the mesh seating surface. The foam adds to the comfort of the seats. Deceleration loads on impact are transmitted by the belts to fully compress the foam and inhibit belt travel.

A further aspect of the invention relates to the concept of providing a cushion, or foam block, under the elastomeric seating surface near the front of the seat bottom cushion to prevent submarining. The cushion is sufficiently rigid so that it functions to block the occupant from sliding out from under a lap belt at impact. The foamblock may be wrapped around the frame with the mesh seating surface being wrapped around the foam block to provide both comfort and impact protection.

The invention also relates to providing an adjustable eccentric lumbar cushion that provides firm lower back support. The eccentric lumbar cushion may be rotated to modify the degree of back rest curvature. The eccentric lumbar cushion is mounted on a flexible shaft that allows for some movement of the cushion to aid in absorbing vibration. In an impact, the flexible shaft may absorb some of the deceleration loads applied to the occupant.

These and other aspects and advantages of the present invention will be better understood in view of the attached drawings and following detailed description of the illustrated modes of practicing the invention.

DETAILED DESCRIPTION OF THE PREFERRED EMBODIMENT(S)

Figure 1:
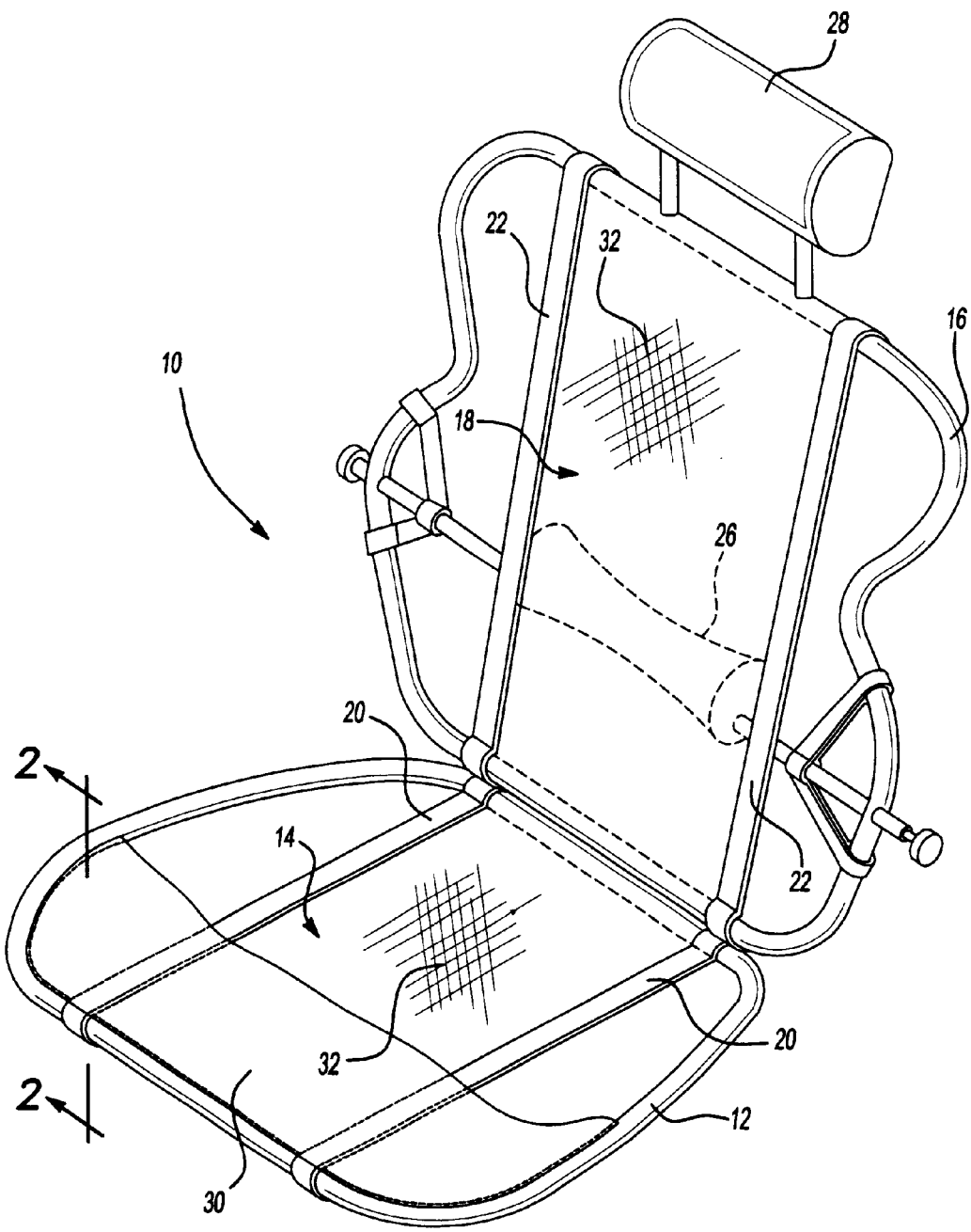
FIG. 1 is front perspective view of the integral suspension seating system of the present invention with the elastomeric fabric removed.

Referring now to FIG. 1, an integral suspension seat 10 made according to the present invention is illustrated. The integral suspension seat 10 includes a seat base tubular frame 12 defining a seat base portion 14. A seat back tubular frame 16 defines a seat back portion 18 generally within its confines.

Two seat base webbing belts 20 extend longitudinally, relative to the vehicle, across the seat base portion 14 and are secured to the seat base tubular frame 12. Two seat back webbing belts 22 extend generally vertically across the seat back portion 16 and are secured to the seat back tubular frame 16 on opposite ends. Webbing belts 20, 22 may also be referred to as "tensioned webbings" or "non-yielding webbings." The belts 20, 22 are relatively non-yielding and may be a closely woven fabric such as that used to make seat belts or the like. Alternative webbing materials for the belts 20, 22 may include extruded polymer material.

The seat 10 is provided with a lumbar support 26 that will be more specifically described below with reference to FIG. 3. A headrest 28 is preferably provided at the upper end of the seat back tubular frame 16. A front cushion 30 is provided at the forward end of the seat base portion 14 and is secured to the seat base tubular frame 12. The front cushion 30 provides additional cushioning and also is made of a relatively rigid foam to prevent submarining in the event of a collision. Submarining refers to a tendency of a person's body to slide under the front portion of the seat base tubular frame 12 that is avoided by providing the front cushion 30. The seat is covered by an elastomeric fabric cover 32 that spans the seat base portion 14 and seat back portion 18. An example of an elastomeric fabric that may be used would be monofilaments made of thermoplastic polymer elastomeric yarns and fabrics. The elastomeric fabric cover 32 is sewn, fastened, adhered or otherwise secured to the webbing belts 20, 22.

Figure 2:
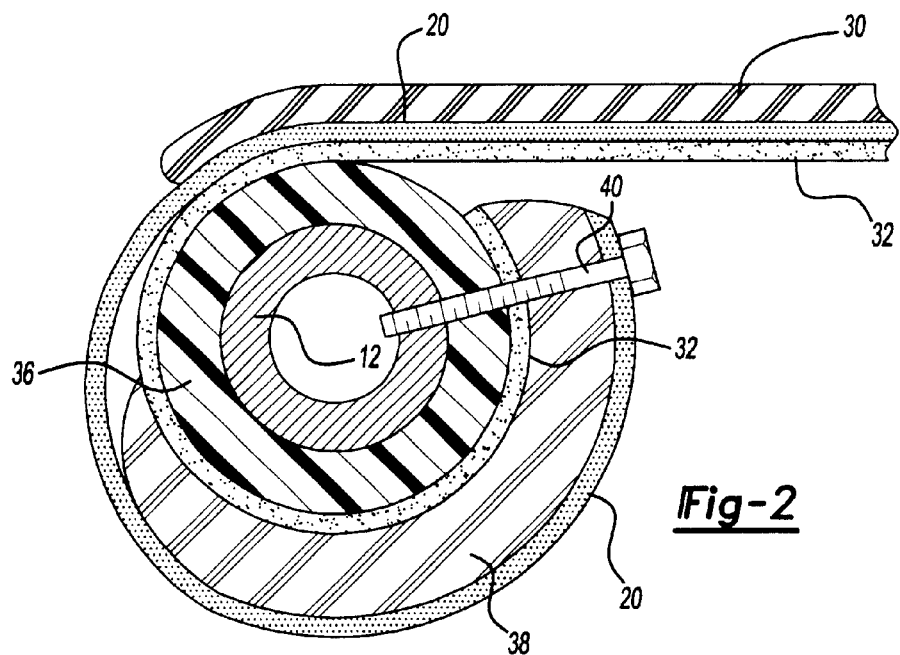
FIG. 2 is a cross-sectional view taken along line 2—2 in FIG. 1.

Referring now to FIG. 2, a shock absorbing mechanism is shown in cross section as it is used to anchor the webbing belts 20, 22 to the tubular frames 12, 14. FIG. 2 is a cross section taken through the seat base portion 14 where one of the seat base webbing belts 20 is secured to the seat base tubular frame 12. The tubular frame is preferably wrapped with foam 36 to provide cushioned padding for comfort and safety. An elastomeric foam block 38 is secured to the seat base tubular frame 12. The foam block 38 is disposed radially outboard of the frame 12 and foam wrapping 36. An anchor pin 40 secures the webbing belt 20 over the elastomeric foam block 38 which is in turn placed over the elastomeric fabric cover 32. The elastomeric cover 32 substantially encircles the foam 36 that is wrapped around the tubular frame 12. The anchor pin 40 extends through each of the component layers to hold the elastomeric fabric cover 32 and webbing belt 20 under tension. The elastomeric foam block 38 provides a unique shock absorbing mechanism for the webbing belt 20.

Under normal operating conditions, the elastomeric foam block 38 absorbs energy and allows the webbing to flex. This improves comfort, allows the seat to conform to the occupant while dampening vibrations encountered in normal operation. In an impact, deceleration loads exerted by the occupant are transmitted by the webbing belts 20, 22 to compress the foam block 38 that stops travel of the webbing. The webbing belts 20, 22 prevent excessive seating surface excursion that has been a long standing problem with prior elastomeric seating designs.

Figure 3:
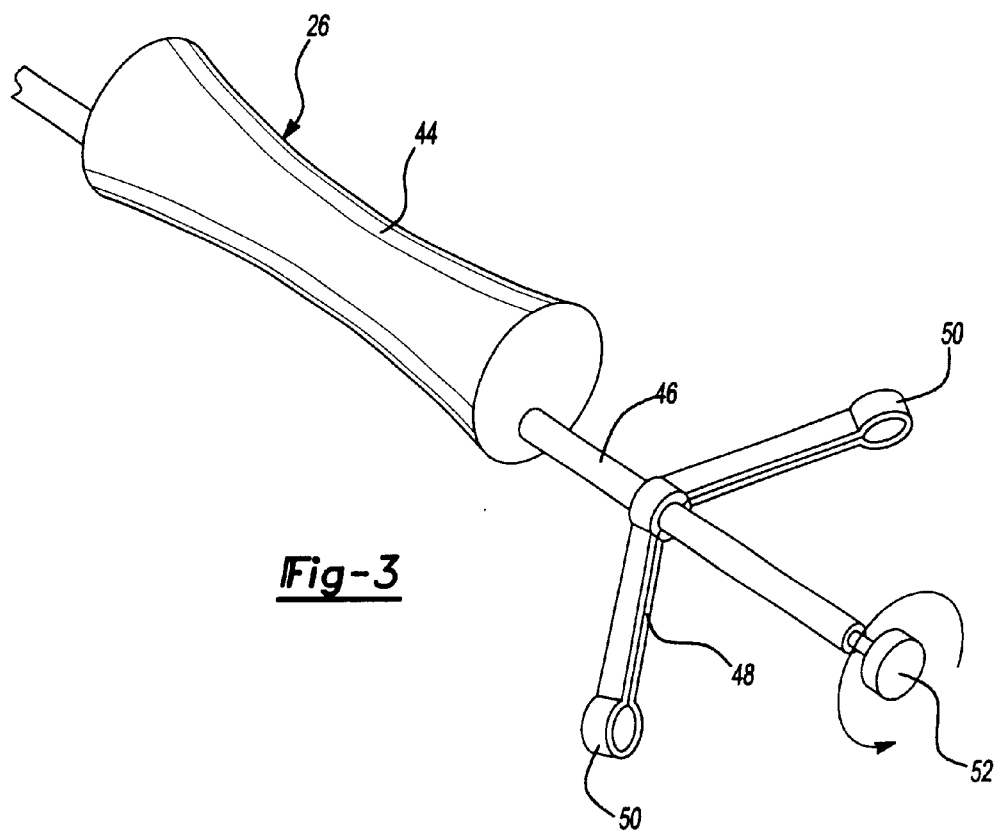
FIG. 3 is a perspective view of the adjustable paraboloid lumbar support of the present invention.

Referring now to FIG. 3, the lumbar support 26 is shown in greater detail. In lumbar support 26 includes a paraboloid lumbar cushion 44 that is received on a shaft 46. The lumbar cushion 44 provides firm lower back support. The eccentric location of the shaft 46 allows an occupant to rotate the shaft, changing the angular orientation of the cushion to increase or decrease the degree of back rest curvature. The shaft 46 is preferably flexible to allow for some movement of the cushion to aid an absorbing vibration. In an impact, the flexible shaft 46 may absorb a portion of the deceleration loads on the occupant. The shaft 46 is preferably received in V brackets 48. The V brackets 48 are assembled to the seat back tubular frame 16 by means of frame attachment receptacles 50 that comprise cylindrical members that are fitted over the frame 16. The position of the lumbar cushion 44 is adjusted by means of a manual adjustment knob 52 in the illustrated embodiment. A motor (not shown) could be attached to the shaft 46 to provide a power adjustment mechanism.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A vehicle seat for a person riding in a vehicle comprising:
    a contoured tubular frame defining a plurality of edges of a seat base and a seat back;
    at least one belt secured to the tubular frame in at least two spaced locations on the tubular frame; and
    an elastomeric mesh seating surface secured to the tubular frame and the belt, wherein the belt draws the mesh seating surface into a concave shape by drawing the mesh seating surface downward within the tubular frame to provide a concave seating surface, the portion of the tubular frame where the belt is secured being lower than the portion of the tubular frame running parallel to the belt.

2. The vehicle seat of claim 1 wherein a foam pad is wrapped around the frame and wherein the mesh seating surface is wrapped around the foam pad that provides comfort and impact protection.

3. The vehicle seat of claim 1 wherein four tensioned belts are provided, two being secured to an upper portion and a lower portion of the seat back of the tubular frame and two being secured to a front portion and a rear portion of the seat base of the tubular frame.

4. The vehicle seat of claim 1 wherein two belts extend in the seat base longitudinally and two belt segments extend vertically in the seat back.

5. The vehicle seat of claim 1 wherein a foam block is provided between the mesh seating surface and the belt under a front portion of the seat base to provide a shock absorbing mechanism in an impact.

6. The vehicle seat of claim 1 wherein the mesh seating surface is secured to the belt to minimize excursion of the mesh seating surface.

7. The vehicle seat of claim 1 wherein an adjustable eccentric lumbar cushion is provided for lower back support, the eccentric lumbar cushion being rotatable to modify the degree of seat back curvature, and the eccentric lumbar cushion being mounted on a flexible shaft that allows for some movement of the cushion to aid in absorbing vibration.

8. A vehicle seat for a person riding in a vehicle comprising:
    a tubular frame defining a seat base and a seat back;
    at least one belt secured to the tubular frame in at least two spaced locations on the tubular frame;
    an elastomeric mesh seating surface secured to the tubular frame and the belt; and
    a foam pad wrapped around the frame, wherein the mesh seating surface and the belt are wrapped around the foam pad that provides comfort and impact protection and the belt draws the mesh seating surface into a concave shape by drawing the mesh seating surface downward within the tubular frame to provide a concave seating surface, the portion of the tubular frame where the belt is secured being lower than the portion of the tubular frame running parallel to the belt.

9. The vehicle seat of claim 8 wherein a foam block is provided between the mesh seating surface and the belt under a front portion of the seat base to provide a shock absorbing mechanism.

10. The vehicle seat of claim 9 wherein an anchor pin secures the belt over the foam block that is disposed radially outboard of the seat base tubular frame and the foam pad that is wrapped around the tubular frame, wherein the anchor pin extends through the belt, the foam block, the mesh seating surface, the foam pad and into the tubular frame.

11. The vehicle seat of claim 8 wherein a foam cushion is provided that extends rearwardly from a front portion of the frame that prevents the mesh seating surface from submarining below the frame in an impact.

12. A vehicle seat for a person riding in a vehicle comprising:

a tubular frame defining a seat base and a seat back;

at least one belt secured to the tubular frame in at least two spaced locations on the tubular frame;

an elastomeric mesh seating surface secured to the tubular frame and the belt; and an adjustable eccentric lumbar cushion provided adjacent a lower portion of the seat back for lower back support, the eccentric lumbar cushion being rotatable to modify the degree of seat back curvature; wherein the belt draws the mesh seating surface into a concave shape by drawing the mesh seating surface downward within the tubular frame to provide a concave seating surface, the portion of the tubular frame where the belt is secured being lower than the portion of the tubular frame running parallel to the belt.

13. The vehicle seat of claim 12 wherein the eccentric lumbar cushion is mounted on a flexible shaft that allows for some movement of the cushion to aid in absorbing vibration.

14. The vehicle seat of claim 13 wherein the shaft is secured to the frame by V-shaped brackets having receptacles for assembling the V-shaped brackets to the frame.

* * * * *